US012441929B2

(12) United States Patent
Recio, III et al.

(10) Patent No.: US 12,441,929 B2
(45) Date of Patent: Oct. 14, 2025

(54) TREATMENT FLUID STABILIZED TO PREVENT POLYMER REACTION

(71) Applicant: Halliburton Energy Services, Inc., Houston, TX (US)

(72) Inventors: Antonio Recio, III, Kingwood, TX (US); I Wayan Rakananda Saputra, Houston, TX (US); Denise Benoit, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 137 days.

(21) Appl. No.: 18/213,486

(22) Filed: Jun. 23, 2023

(65) Prior Publication Data

US 2024/0425745 A1    Dec. 26, 2024

(51) Int. Cl.
*C09K 8/508* (2006.01)
*C09K 8/504* (2006.01)

(52) U.S. Cl.
CPC ............ *C09K 8/508* (2013.01); *C09K 8/5045* (2013.01); *C09K 2208/28* (2013.01); *C09K 2208/30* (2013.01)

(58) Field of Classification Search
CPC .............. C09K 8/5045; C09K 2208/28; C09K 2208/30
See application file for complete search history.

(56) References Cited

U.S. PATENT DOCUMENTS

| 5,620,947 A | * | 4/1997 | Elward-Berry | .......... C09K 8/12 507/225 |
| 11,326,091 B2 | | 5/2022 | Li et al. | |
| 2010/0305015 A1 | * | 12/2010 | Hawkins | ................ A61K 8/044 510/139 |

OTHER PUBLICATIONS

Product Data Sheet of Driscal D Polymer, retrieved 2025 from Chevron Phillips Chemical website.*
Product Data Sheet.*

* cited by examiner

*Primary Examiner* — Aiqun Li
(74) *Attorney, Agent, or Firm* — McAfee & Taft

(57) ABSTRACT

A water-based carrier-fluid system comprising a brine formed from water saturated with at least one saturation salt, a viscoelastic surfactant, and one or more salt crystals. The water-based carrier-fluid system is formed by adding the viscoelastic surfactant to the brine to produce a first mixture prior to the one or more salt crystals being added to the mixture. The salt in the salt crystals has a Ksp value equal to or greater than the saturation salt.

19 Claims, 2 Drawing Sheets

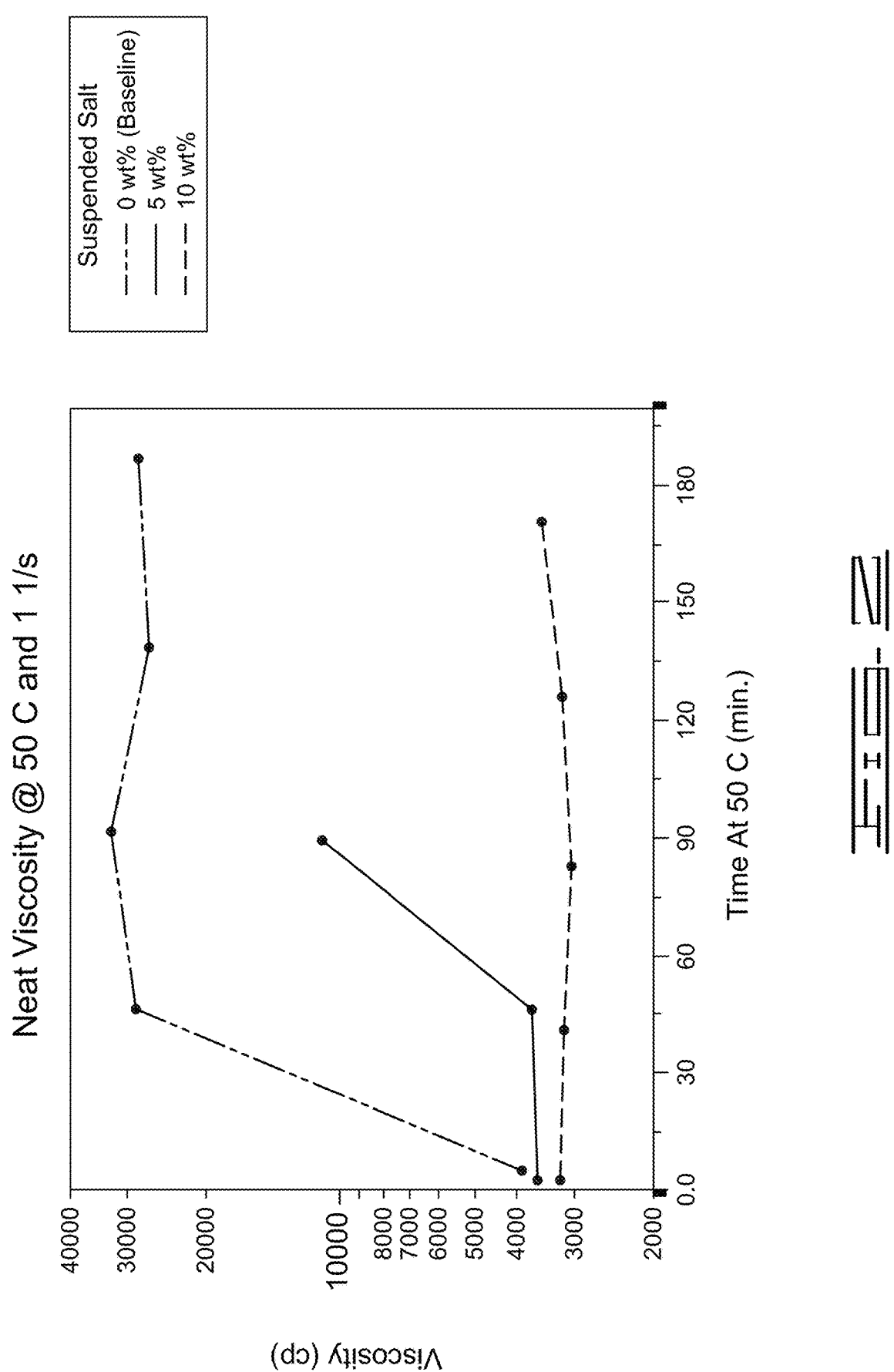

TREATMENT FLUID STABILIZED TO PREVENT POLYMER REACTION

FIELD

The present disclosure relates to methods and compositions used in treating subterranean formations.

BACKGROUND

Treatment fluids may be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid.

Such treatment fluids often contain polymers, which for example can be used as gelling agents, or to change physical properties of the treatment fluids, such as altering suspension capability, viscosity, friction reduction or other similar properties. For example, one production stimulation operation that employs a treatment fluid is hydraulic fracturing. Hydraulic fracturing operations generally involve pumping a treatment fluid (e.g., a fracturing fluid) into a wellbore that penetrates a subterranean formation at a sufficient hydraulic pressure to create or enhance one or more cracks, or "fractures," in the subterranean formation. The fracturing fluid may include particulates, often referred to as "proppant" particulates, that are deposited in the fractures. The proppant particulates function, inter alia, to prevent the fractures from fully closing upon the release of hydraulic pressure, forming conductive channels through which fluids and hydrocarbons may flow to the wellbore.

In certain approaches, hydraulic fracturing may use a cross-linked polymer to increase the viscosity of the fracturing fluid. The relatively high viscosity of such a fluid may, among other benefits, help transport the proppant particulates to the desired location within the formation and/or allow the fracturing fluid to be loaded with a higher concentration of proppant particulates. Once at least one fracture is created and the proppant particulates are substantially in place, the viscosity of the fracturing fluid usually is reduced, and the fracturing fluid may be recovered from the formation. The treatment fluid that is recovered is known as a flowback fluid.

An alternative type of hydraulic fracturing, known as slickwater hydraulic fracturing, does not use a cross-linked polymer. The fracturing fluid has a relatively low viscosity as a result. Slickwater fracturing may be used to generate narrow, complex fractures with low concentrations of proppants. Because the viscosity of the fracturing fluid is relatively low, the proppant transport is achieved by increasing the pumping rate and pressure of the fracturing fluid. During pumping, significant energy loss can occur due to the friction between the fracturing fluid and the casing or tubing, particularly when the fracturing fluid is in turbulent flow.

A friction reducing polymer is often introduced to the treatment fluid during slickwater fracturing operations to minimize such energy consumption. The friction reducing polymer is typically an uncross-linked polymer because cross-linking often reduces the ability of the polymer to suppress friction during pumping operations, and in fact, often results in increased friction. The friction reducing polymer facilitates laminar flow of the treatment fluid, which causes less frictional forces and energy loss than turbulent flow of the same fluid.

Water-based treatment fluids can rely on the reaction of the polymer with the water to alter the physical property of the treatment fluid; however, such water-based treatment fluids are subject to the polymer reacting prematurely; that is, the reaction occurs prior to the optimal time during use or even before the treatment fluid is used. The premature reaction could also be caused by the increased ambient temperature of the field where the treatment is performed.

BRIEF DESCRIPTION OF THE DRAWINGS

The drawings included with this application illustrate certain aspects of the embodiments described herein. However, the drawings should not be viewed as depicting exclusive embodiments. The subject matter disclosed herein is capable of considerable modifications, alterations, combinations, and equivalents in form and function, as will be evident to those skilled in the art with the benefit of this disclosure.

FIG. 2 is graph illustrating the viscosity vs. time of various water-based carrier-fluid systems when the temperature is increased to 50° C. from ambient.

DETAILED DESCRIPTION

Figure 1:
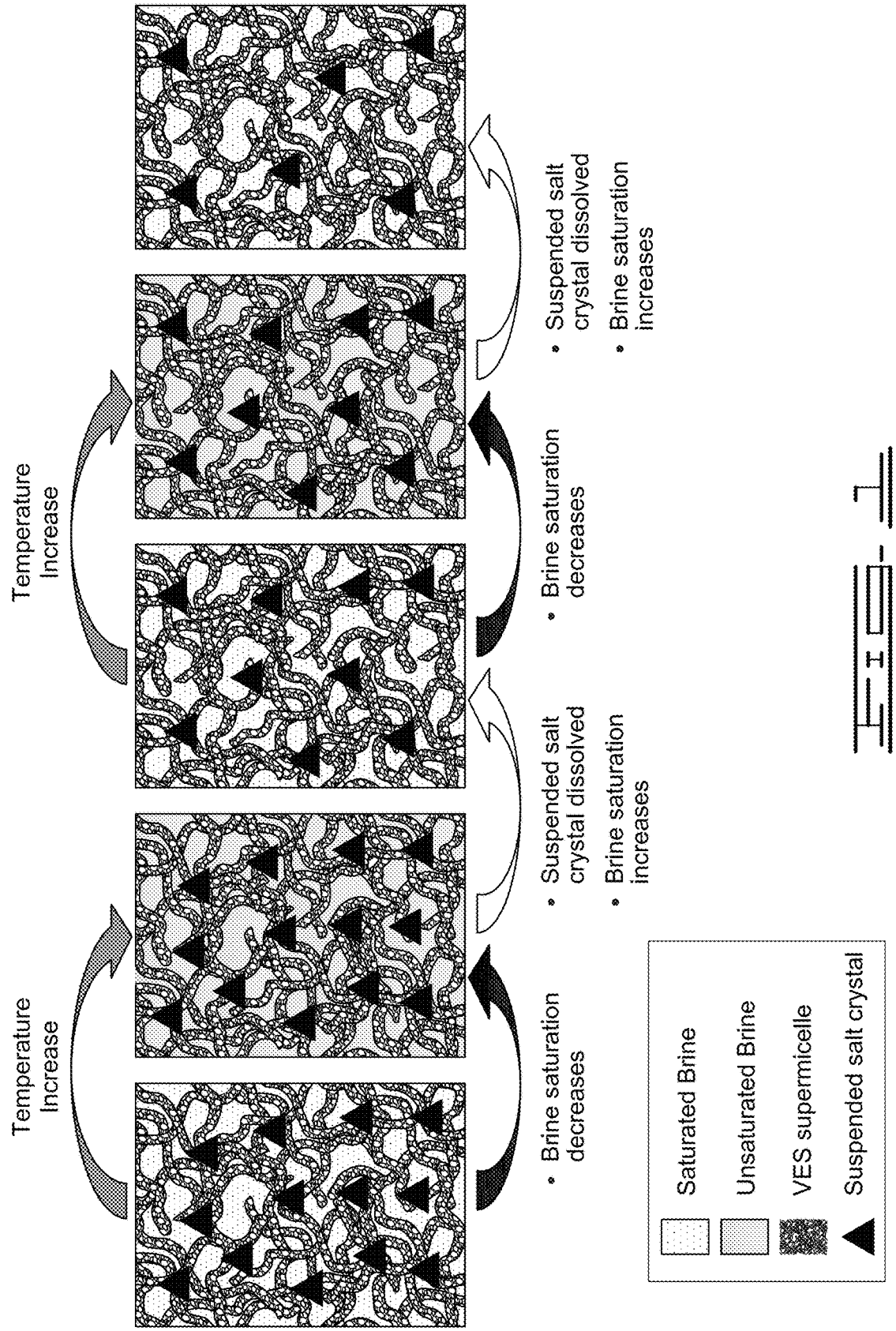
FIG. 1 is a simplified schematic illustration of the principle of operation of the carrier fluid of the current disclosure.

The present disclosure may be understood more readily by reference to this detailed description as well as to the examples included herein. For simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the examples described herein. The drawings are not necessarily to scale and the proportions of certain parts have been exaggerated to better illustrate details and features of the present disclosure.

As used herein and in the appended claims, the following terms and phrases have the corresponding definitions set forth below.

The term "bound water" refers to water which is bound by water-soluble material within a system or composition and which is not available to react with a suspended chemical.

The term "free water" refers to the excess water in a system or composition in which solutes such as salt and other generally water-soluble material can be dissolved or which is available to react with a suspended chemical.

The term "polymer" means a chemical compound or mixture of compounds formed by polymerization and having repeating subunits (also referred to as monomers). Unless stated otherwise, the term "polymer" includes and encompasses homopolymers, copolymers, terpolymers and the like. The term "copolymer" means a chemical compound or mixture of compounds formed by polymerization and having two or more different types of subunits (also referred to as monomers) that are linked to form a polymer chain.

The term "react" or "reacts" or "reacting" as used herein, with respect suspended chemicals (such as polymers) and brine, refers to the suspended chemical combining with free water in a hydration reaction or which dissolve, disperse or swell in the presence of free water, and consequently change one or more physical properties of aqueous system, such as causing gelation or thickening, increasing viscosity, or reduce friction.'

The term "suspended chemical" means a chemical that reacts with free water in the brine and consequently changes the physical properties of the aqueous system by undergoing gelation or thickening. For example, the suspended chemical can be one or more water-soluble polymers or other hygroscopic chemicals.

The term "viscoelastic surfactant" or "VES" as used herein includes any suitable surfactant that is capable of imparting viscoelastic properties to an aqueous fluid. The viscoelastic surfactants of this disclosure are typically non-polymeric and/or have a higher solubility in water or brine than do the suspended chemicals of this disclosure.

A "water soluble polymer" means a polymer that dissolves or swells in an aqueous-based well treatment fluid and thus modifies one or more physical properties of the well treatment fluid.

A "well treatment fluid" means any fluid that is introduced into a well or subterranean formation penetrated thereby to treat the wellbore, subterranean formation, and/or equipment associated with the wellbore and/or subterranean formation (e.g., a casing). For example, a well treatment fluid can be a drilling fluid (for example, a drilling mud), a spacer fluid (for example, a cement spacer fluid), a cement composition, or a completion fluid.

Unless stated otherwise, a "mixture" means a mixture or a solution of two or more components.

Whenever a range is disclosed herein, the range includes independently and separately every member of the range extending between any two numbers enumerated within the range. Furthermore, the lowest and highest numbers of any range shall be understood to be included within the range set forth.

Water-based carrier-fluid system for suspended chemicals, for example hygroscopic chemicals, can be made using a saturated brine thus removing any free water for the suspended chemical to react. Once the well operation is ready for the suspended chemical to react with water, the free water in the aqueous system can be increased. Unfortunately, it has been discovered that such aqueous systems are not stable. For example, when the aqueous system is exposed to increased temperatures, the carrier fluid becomes unsaturated as salt solubility increases with increasing temperature. This results in the availability of free water in the aqueous system, causing premature reaction of the suspended chemical. For example, one such aqueous system is a water-based friction reducer slurry. For such a slurry, the premature reaction results in the instability of the slurry when stored at higher temperature locations than the temperature at which the slurry was prepared.

Having realized this a problem, the current disclosure overcomes it. The water-based carrier-fluid system of the current application does not have the temperature stability issue of prior systems; accordingly, it does not lose its saturation at higher temperatures.

In accordance with the present disclosure, the water-based carrier-fluid system comprises a brine formed from water saturated with at least one saturation salt, a viscoelastic surfactant, and one or more salt crystals. As further discussed below, the saturation salt consists of one or more first salts. The one or more salt crystals is formed primarily from at least one crystalized salt. The crystalized salt consisting of one or more second salts wherein the solubility product constant (Ksp value—in water) of each second salt is equal to or higher than the Ksp value of each of the first salts. The solubility product constant, Ksp, is the equilibrium constant for a solid substance dissolving in an aqueous solution. It represents the level at which a solute dissolves in solution. The more soluble a substance is, the higher the Ksp value it has.

For the water-based carrier-fluid system, the order of preparation is important and can affect the results achieved and the stability of the resulting system. Accordingly, it is presently preferred for the water-based carrier-fluid system is formed by adding the viscoelastic surfactant to the brine to produce a first mixture prior to the one or more salt crystals being added to the mixture to produce the water-based carrier-fluid system.

For example, the method can comprise first forming the brine from water and at least one saturation salt. The brine is formed such that at a first temperature (typically ambient temperature) the brine is saturated with the saturation salt(s). Next a viscoelastic surfactant is added to the brine to form a mixture. Typically, the amount of viscoelastic surfactant added is sufficient to ensure that the salt crystals (added in the next step) can be homogeneously suspended throughout the mixture. Generally, a homogeneous suspension means that if you take the suspension and split it in to two equal volumes, then you should have equal amounts of solids (salt crystals) and liquid (mixture) in both. As there may be some variation in such a split, for the present disclosure the mixture homogenously suspends the salt crystal if, when split, the amount of salt crystals in the first half is within about 20% of the amount of salt crystals in the second half, more typically within about 10% or with in about 5%.

Next a plurality of the salt crystals is added to the mixture so as to produce a temperature-stabilized carrier-fluid system. As will be realized from the above the salt crystals are typically homogenously suspended throughout the mixture.

After the temperature-stabilized carrier-fluid system is produced, a suspended chemical can then be added to the carrier-fluid system. Typically, the suspended chemical is one chosen to form a treatment fluid for a subterranean operation, but for which it is desirable to delay reacting the suspended chemical with water prior to use, such as during storage, transpiration, etc.

As indicated above, first temperature at which the brine is saturated with the saturation salt is ambient temperature. Additionally, the subsequent steps of adding the viscoelastic surfactant and the salt crystals are also typically carried out at about the same temperature as the first temperature, usually ambient temperature. Addition of the suspended chemical can be at about same temperature (typically ambient temperature), though the carrier-fluid system is already temperature stabilized so the suspended chemical can be added at a higher temperature. Ambient temperature (generally about room temperature 20° C. to 25° C.) is typical because usually the concern with stability of the fluid system is its exposure to higher temperatures during storage, transpiration, etc. However, a higher first temperature could be successfully used.

While not wishing to be bound by theory, it is believed that producing a saturated brine and then adding the viscoelastic surfactant (VES) substantially binds all the water at the first temperature; thus, the mixture has substantially only bound water. When the salt crystals are then added, they remain in a crystalline form due to the saturated nature of the mixture. Likewise, there is no free water for any suspended chemical to react with. At higher temperatures, the water has the capacity to dissolve more water and viscoelastic surfactant; thus, a mixture of brine and viscoelastic surfactant (without the salt crystals) would have free water at higher temperatures which would react with any suspended chemicals. However, in the mixture with the salt crystals, as the temperature increases, a portion of the crystalize salt dissolves into the brine-VES mixture thus binding the water before the suspended chemical can react with the free water.

Further, it is currently believed that adding more salt to the saturate brine prior to VES addition, so that the brine at the start of the process has more salt than required to achieve saturation, would results in salt crystallization (formations of crystals immediately following saturation), which reduces the brine from saturation because salt crystals formation would remove more salt than just that required to produce a saturated brine. It is believed that this difficulty when the current system is cooled from the first temperature by the salt crystals having higher solubility than the saturation salt.

Referring to FIG. 1, the mechanism of the current water-based carrier-fluid system can be better understood. Starting from the left, the current carrier-fluid system includes the saturated brine, VES and suspended salt crystals at the first temperature (in this case ambient temperature). As the temperature increases the brine becomes unsaturated due to the greater solubility at higher temperatures; however, portions of the salt crystals then dissolve returning the brine to a saturated state. This process continues with further increases in temperatures.

As will be realized from the above, the salt crystals should be added after the VES is added to the saturated brine and should be present sufficiently that at least a portion of the salt crystals remain in crystal form at temperatures higher than the first temperature to insure continued stability. Generally, this means that the salt crystals should be present sufficiently that at least a portion of the salt crystals remain in crystal form up to the boiling point of the brine.

As previously discussed, the brine is saturated with a saturation salt. While generally a single salt is sufficient for this, if desired a combination of salts can be used for the saturation salt. Thus, the saturation salt typically consists of one or more first salts. The main requirement for these first salt is that it be no more soluble in water than the second salt, or that the solubility product constant (Ksp value) associated with each first salt is no greater than the each of the second salts' Ksp value (as discussed further below). Accordingly, this disclosure will sometimes refer to the "first Ksp" value which is the highest Ksp of all the first salts used in forming the saturated brine. Typically, the first Ksp value will be lower than the Ksp of all of the second salts; thus, all the first salts used to create the saturated brine will have a lower Ksp value than any of the second salts used.

The one or more salt crystals are formed primarily from at least one crystalized salt. The crystalized salt consisting of one or more second salts. A used herein "formed primarily" or "comprised primarily" refers to that there may be impurities in the salt crystals or non-second salts in the salt crystals as long as the amount of such impurities or non-second salts is not sufficient to adversely affect the carrier-fluid systems ability to prevent suspended chemicals for reacting with water. For example, the impurities would be less than 5 wt %, less than 3 wt %, less than 2 wt % or less than 1 wt %. For example, the salt crystals can be present carrier-fluid system in an amount of at least 3 wt %, or at least 5 wt %, or at least 7 wt % or at least 10 wt % based on the amount of brine-VES mixture.

As will be evident from the above, the Ksp value of each second salt is equal to or higher than the Ksp value of each of the first salts, and preferably is greater than the Ksp value of each of the first salts. For example, the first Ksp value can be 500 or less and the Ksp value of each of the second salts used can be 501 or more. For example, the first Ksp value can be 1200 or less and the second Ksp can be greater than 1200. As will be realized, the Ksp values are for the salt and water at the first temperature (the temperature of formation of the saturated brine) which will typically be ambient temperature (generally approximately 20° C. to 25° C.).

For example, the first salt and second salt can be selected from the group consisting of salts formed from sodium, potassium, ammonium, calcium, magnesium, strontium, formate, acetate, bicarbonate, carbonate, bromide, chloride, iodide, fluoride, nitrate, phosphate, and sulfate ions, provided that the second salt has a Ksp equal to or higher than the first Ksp value.

For example, suitable first salts and second salts can include, but are not limited to, ammonium sulfate, ammonium chloride, potassium chloride, sodium sulfate, magnesium sulfate, aluminum sulfate, sodium bromide, potassium bromide, calcium chloride, calcium bromide, zinc bromide, sodium chloride, magnesium chloride, strontium chloride, barium chloride, sodium bicarbonate, a carbonate salt, a sulfate salt, a nitrate salt, a phosphate salt, a magnesium salt, a bromide salt, a formate salt, an acetate salt, a chloride salt, a fluoride salt, an iodide salt, a bicarbonate salt, a nitrate salt, a phosphate salt, and any combination thereof.

A listing of some suitable salts and their Ksp values are provided in Table 1, for reference. For example, in accordance with the above discussion, the first salts used to form the brine could be NaBr and NaNO$_3$ and the second salt used to form the salt crystals could then be MgI$_2$, NH$_4$HCO$_2$ and NH$_4$F. For example, the first salt used to form the brine could be K$_2$PO$_4$ and the second salt used to form the salt crystals could be CaCl$_2$).

TABLE 1

| Salt | Ksp |
|---|---|
| NaF | 0.9 |
| K$_2$SO$_4$ | 1.0 |
| NaHCO$_3$ | 1.3 |
| Sr(HCO$_2$)$_2$ | 1.5 |
| Na$_2$PO$_4$ | 2.5 |
| Ca(HCO$_3$)$_2$ | 4.3 |
| NH$_4$HCO$_3$ | 7.5 |
| Mg(HCO$_2$)$_2$ | 8.0 |
| Ca(HCO$_2$)$_2$ | 8.3 |
| KNO$_3$ | 9.8 |
| Na$_2$SO$_4$ | 10.3 |
| KHCO$_3$ | 11.3 |
| Na$_2$CO$_3$ | 12.8 |
| (NH$_4$)$_2$PO$_4$ | 14.9 |
| KCl | 21.0 |
| KBr | 30.1 |
| Sr(C$_2$H$_3$O$_2$)$_2$ | 31.9 |
| NaC$_2$H$_3$O$_2$ | 32.0 |
| NaCl | 37.7 |
| Ca(C$_2$H$_3$O$_2$)$_2$ | 42.2 |
| CaI$_2$ | 45.3 |
| NH$_4$Br | 60.8 |
| MgSO$_4$ | 72.3 |
| NH$_4$Cl | 73.3 |
| KI | 75.2 |
| NaBr | 77.9 |
| NaNO$_3$ | 106.2 |
| NH$_4$I | 140.8 |
| NaI | 141.0 |
| NaHCO$_2$ | 142.6 |
| SrCl$_2$ | 148.6 |
| Sr(NO$_3$)$_2$ | 149.8 |
| Mg(C$_2$H$_3$O$_2$)$_2$ | 211.0 |

TABLE 1-continued

| Salt | Ksp |
|---|---|
| KF | 266.8 |
| SrBr$_2$ | 280.2 |
| NH$_4$C$_2$H$_3$O$_2$ | 344.2 |
| Mg(NO$_3$)$_2$ | 411.6 |
| MgI$_2$ | 510.2 |
| NH$_4$HCO$_2$ | 514.3 |
| NH$_4$F | 530.4 |
| SrI$_2$ | 566.8 |
| NH$_4$NO$_3$ | 575.4 |
| K$_2$PO$_4$ | 605.7 |
| MgBr$_2$ | 660.3 |
| KC$_2$H$_3$O$_2$ | 680.5 |
| (NH$_4$)$_2$SO$_4$ | 743.1 |
| MgCl$_2$ | 754.4 |
| K$_2$CO$_3$ | 965.4 |
| CaCl$_2$ | 1209.9 |
| CaBr$_2$ | 1464.6 |
| (NH$_4$)$_2$CO$_3$ | 1584.3 |
| KHCO$_2$ | 1605.1 |
| Ca(NO$_3$)$_2$ | 1943.6 |

The viscoelastic surfactant is typically non-polymeric and have a higher solubility in water or brine than do the suspended chemicals of this disclosure.

The surfactants included in the viscoelastic surfactant fluids of the present disclosure may comprise any suitable surfactant that is capable of imparting viscoelastic properties to an aqueous fluid. These surfactants may be cationic, anionic, or amphoteric in nature, and comprise any number of different compounds, including methyl ester sulfonates, betaines, modified betaines, sulfosuccinates, taurates, amine oxides, ethoxylated fatty amines, quaternary ammonium compounds, derivatives thereof, and combinations thereof. The term "derivative" is defined herein any compound that is made from one of the listed compounds, for example, by replacing one atom in one of the listed compounds with another atom or group of atoms, ionizing one of the listed compounds, or creating a salt of one of the listed compounds. The surfactant should be present in a viscoelastic surfactant fluid of the present invention in an amount sufficient to provide the desired homogeneous suspension of the salt crystals.

For example, suitable viscoelastic surfactants can be selected from the group consisting of zwitterionic headgroup, tallow amidoamine oxide, ethoxylated ammonium chloride, alkyl sulfates, alkyl ether sulfates, alkyl ester sulfonates, alpha olefin sulfonates, linear alkyl benzene sulfonates, branched alkyl benzene sulfonates, linear dodecylbenzene sulfonates, branched dodecylbenzene sulfonates, alkylbenzene sulfonic acids, dodecylbenzene sulfonic acid, sulfosuccinates, sulfated alcohols, ethoxylated sulfated alcohols, alcohol sulfonates, ethoxylated and propoxylated alcohol sulfonates, alcohol ether sulfates, ethoxylated alcohol ether sulfates, propoxylated alcohol sulfonates, sulfated nonyl phenols, ethoxylated and propoxylated sulfated nonyl phenols, sulfated octyl phenols, ethoxylated and propoxylated sulfated octyl phenols, sulfated dodecyl phenols, ethoxylated and propoxylated sulfated dodecyl phenols, quaternary amine compounds, amine oxide compounds, quad-diamines compounds, erucic dimethyl amidopropyl betaine, dicarboxylic coconut derived sodium salt, cocamidopropyl dimethylamine, cocamidopropyl betaine, alkylether hydroxypropyl sultaine, or amine oxide, and combinations thereof. In some applications, the viscoelastic surfactant is selected from a subgroup consisting of one or more of the aforementioned compounds and combinations thereof.

The suspended chemical includes various polymers that react with free water to consequently change the physical properties of the aqueous system by undergoing gelation or thickening. For example, the suspended chemical can be one or more water-soluble polymers such as polyethylene glycol, polyacrylamides, polyacrylic acid copolymer, and polyvinyl alcohol. For example, the suspended chemical is an anionic polymer friction reducer. Additionally, the suspended chemical can be various cross-linked or cross-linkable polymer gelation or thickening agents used commonly in down hole operations.

As will be realized, the water for the brine can come from a variety of sources but generally will be fresh water, without any salts or without any salts higher in Ksp than the desired first Ksp value, and without any impurities that will interfere with the operation of the water-based carrier-fluid system.

The advantages of the current water-based carrier-fluid system can be better from FIG. 2, wherein a suspended chemical capable of effecting viscosity is included in three water-based carrier-fluid system. The water-based carrier-fluid systems used were (a) one with saturated brine and VES but no suspended salt; (b) one with saturated brine, VES and suspended salt (5 wt %); and (c) one with saturated brine, VES and suspended salt (10 wt %). In all cases the systems were prepared at about room temperature. After preparation, the temperature of each system was raised to 50° C. As can be seen for the system without the suspended salt, the suspended chemical hydrated so that by around 45 minutes the system's viscosity increased by an order of magnitude. The system with 5 wt % suspended salt showed a delay hydration of the suspended chemical, and the system with 10 wt % suspended salt was stable with virtually the same viscosity of about a 3-hour period.

The exemplary fluids and compositions disclosed herein may directly or indirectly affect one or more components or pieces of equipment associated with the preparation, delivery, recapture, recycling, reuse, and/or disposal of the disclosed fluids and compositions. For example, the disclosed fluids and compositions may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the exemplary fluids and compositions. The disclosed fluids and compositions may also directly or indirectly affect any transport or delivery equipment used to convey the fluids and compositions to a well site or downhole such as, for example, any transport vessels, conduits, pipelines, trucks, tubulars, and/or pipes used to compositionally move the fluids and compositions from one location to another, any pumps, compressors, or motors (e.g., topside or downhole) used to drive the fluids and compositions into motion, any valves or related joints used to regulate the pressure or flow rate of the fluids and compositions, and any sensors (i.e., pressure and temperature), gauges, and/or combinations thereof, and the like. The disclosed fluids and compositions may also directly or indirectly affect the various downhole equipment and tools that may come into contact with the fluids and compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Certain embodiment of this disclosure will be better understood by reference to the following numbered embodiments.

Embodiment 1. A composition comprising:
a water-based carrier-fluid system comprising:
a brine formed from water saturated with at least one saturation salt, the at least one saturation salt consisting of one or more first salts wherein each first salt has a Ksp value, the highest of which is a first Ksp value;
a viscoelastic surfactant; and
one or more salt crystals comprised primarily from at least one crystalized salt, the at least one crystalized salt consisting of one or more second salts wherein the Ksp value of each second salt is equal to or higher than the first Ksp value. Optionally, in some embodiments, the water-based carrier-fluid system has only the one or more salt crystals and does not have any salt crystals formed primarily (more than 5 wt %, more than 3 wt %, more than 2 wt % or more than 1 wt %) from salts that are not second salts.

Embodiment 2. The composition of embodiment 1, wherein the water-based carrier-fluid system is formed by adding the viscoelastic surfactant to the brine to produce a first mixture prior to the one or more salt crystals being added to the mixture to produce the water-based carrier-fluid system.

Embodiment 3. The composition of embodiment 2, wherein the brined is saturated with the first salts at a first temperature, and the salt crystals are present sufficiently that at least a portion of the salt crystals remain in crystal form at temperatures higher than the first temperature, typically, at temperatures lower than the boiling point of the brine.

Embodiment 4. The composition of embodiment 3, wherein the first temperature is ambient temperature at which the water-based carrier-fluid system is formed, and wherein the salt crystals are homogeneously dispersed into the first mixture.

Embodiment 5. The composition of any of embodiments 1 to 4, wherein the first salts and second salts are selected from the group consisting of salts formed from sodium, potassium, ammonium, calcium, magnesium, formate, carbonate, bromide, chloride, iodide, nitrate, phosphate, and sulfate ions, provided that each second salt has a Ksp higher the first Ksp value.

Embodiment 6. Then composition of any of embodiments 1 to 5, wherein the viscoelastic surfactant is selected from the group consisting of zwitterionic headgroup, tallow amidoamine oxide, ethoxylated ammonium chloride, alkyl sulfates, alkyl ether sulfates, alkyl ester sulfonates, alpha olefin sulfonates, linear alkyl benzene sulfonates, branched alkyl benzene sulfonates, linear dodecylbenzene sulfonates, branched dodecylbenzene sulfonates, alkylbenzene sulfonic acids, dodecylbenzene sulfonic acid, sulfosuccinates, sulfated alcohols, ethoxylated sulfated alcohols, alcohol sulfonates, ethoxylated and propoxylated alcohol sulfonates, alcohol ether sulfates, ethoxylated alcohol ether sulfates, propoxylated alcohol sulfonates, sulfated nonyl phenols, ethoxylated and propoxylated sulfated nonyl phenols, sulfated octyl phenols, ethoxylated and propoxylated sulfated octyl phenols, sulfated dodecyl phenols, ethoxylated and propoxylated sulfated dodecyl phenols, quaternary amine compounds, amine oxide compounds, quad-diamines compounds, erucic dimethyl amidopropyl betaine, dicarboxylic coconut derived sodium salt, cocamidopropyl dimethylamine, cocamidopropyl betaine, alkylether hydroxypropyl sultaine, or amine oxide, and combinations thereof. In some applications, the viscoelastic surfactant is selected from a subgroup consisting of one or more of the aforementioned compounds and combinations thereof.

Embodiment 7. The composition of any of embodiments 1 to 6, wherein the first Ksp value is 500 or less and the Ksp value of each of the one or more second salts are 501 or more.

Embodiment 8. The composition of embodiments 1 to 6, wherein the first Ksp Value is 1200 or less and the Ksp value of each of the one or more second salts are above 1200.

Embodiment 9. The composition of any of embodiments 1 to 8, further comprising a suspended chemical which reacts with free-water when present in the brine.

Embodiment 10. The composition of embodiment 9, wherein the suspended chemical is an anionic polymer friction reducer.

Embodiment 11. The composition of any of embodiments 1 to 10, wherein the brined is saturated with the first salts at ambient temperature, the water-based carrier-fluid system is formed by adding the viscoelastic surfactant to the brine at about the same ambient temperature to produce a first mixture prior to the one or more salt crystals being added to the mixture at about the same ambient temperature to produce the water-based carrier-fluid system.

Embodiment 12. A method comprising:
providing a mixture of a brine and a viscoelastic surfactant, wherein the brine comprises water and at least one saturation salt, and wherein the water is saturated with the at least one saturation salt at a first temperature, and wherein the at least one saturation salt consisting of one or more first salts wherein each first salt has a Ksp value the highest of which is a first Ksp value; and
adding one or more salt crystals comprising primarily from at least one crystalized salt to the mixture so as to produce a temperature-stabilized carrier-fluid system, wherein the one or more crystalized salt consists of one or more second salts wherein the Ksp value of each second salt is equal to or higher than the first Ksp value. Optionally, in some embodiments, the temperature-stabilized carrier-fluid, when produced, has only the one or more salt crystals and does not have any salt crystals formed primarily (more than 5 wt %, more than 3 wt %, more than 2 wt % or more than 1 wt %) from salts that are not second salts.

Embodiment 13. The method of embodiment 12, wherein the salt crystals are distributed homogenously in temperature-stabilized carrier-fluid system.

Embodiment 14. The method of either embodiment 12 or embodiment 12, wherein the salt crystals are present sufficiently that at least a portion of the salt crystals remain in crystal form at temperatures higher than the first temperature, typically, at temperatures lower than the boiling point of the brine.

Embodiment 15. The method of any of embodiments 12 to 14, wherein the first temperature is ambient temperature, and the step of providing the mixture comprises:

providing the brine at ambient temperature so that the water is saturated with the first salts; and introducing the viscoelastic surfactant into the brine at ambient temperature so as to produce the mixture.

Embodiment 16. The method of any of embodiments 12 to 15, further comprising adding a suspended chemical to the temperature-stabilized carrier-fluid system, wherein the suspended chemical reacts with free-water when present in the brine.

Embodiment 17. The method of any of embodiments 12 to 16, wherein the first salts and second salts are selected from the group consisting of salts formed sodium, potassium, ammonium, calcium, magnesium, formate, carbonate, bromide, chloride, iodide, nitrate, phosphate, and sulfate ions, provided that each second salt has a Ksp higher the first Ksp value.

Embodiment 18. The method of any of embodiments 12 to 17, wherein the suspended chemical is an anionic polymer friction reducer.

Embodiment 19. Then composition of any of embodiments 12 to 18, wherein the viscoelastic surfactant is selected from the group consisting of zwitterionic headgroup, tallow amidoamine oxide, ethoxylated ammonium chloride, alkyl sulfates, alkyl ether sulfates, alkyl ester sulfonates, alpha olefin sulfonates, linear alkyl benzene sulfonates, branched alkyl benzene sulfonates, linear dodecylbenzene sulfonates, branched dodecylbenzene sulfonates, alkylbenzene sulfonic acids, dodecylbenzene sulfonic acid, sulfosuccinates, sulfated alcohols, ethoxylated sulfated alcohols, alcohol sulfonates, ethoxylated and propoxylated alcohol sulfonates, alcohol ether sulfates, ethoxylated alcohol ether sulfates, propoxylated alcohol sulfonates, sulfated nonyl phenols, ethoxylated and propoxylated sulfated nonyl phenols, sulfated octyl phenols, ethoxylated and propoxylated sulfated octyl phenols, sulfated dodecyl phenols, ethoxylated and propoxylated sulfated dodecyl phenols, quaternary amine compounds, amine oxide compounds, quad-diamines compounds, erucic dimethyl amidopropyl betaine, dicarboxylic coconut derived sodium salt, cocamidopropyl dimethylamine, cocamidopropyl betaine, alkylether hydroxypropyl sultaine, or amine oxide, and combinations thereof. In some applications, the viscoelastic surfactant is selected from a subgroup consisting of one or more of the aforementioned compounds and combinations thereof.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments described herein. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges, some lower limits listed may be greater than some upper limits listed. One skilled in the art will recognize that the selected subset will require the selection of an upper limit in excess of the selected lower limit.

Therefore, the present treatment additives and methods are well adapted to attain the ends and advantages mentioned, as well as those that are inherent therein. The particular examples disclosed above are illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method to prevent a suspended chemical from reacting with free water, the method comprising:
   providing a mixture of a brine and a viscoelastic surfactant, wherein the brine comprises water and at least one saturation salt, and wherein the water is saturated with the at least one saturation salt at a first temperature, and wherein the at least one saturation salt consisting of one or more first salts wherein each first salt has a Ksp value, the highest of which is a first Ksp value; and
   adding one or more salt crystals to the mixture, wherein the one or more salt crystals are comprised primarily from at least one crystalized salt to the mixture so as to produce a temperature-stabilized carrier-fluid system, wherein the at least one crystalized salt consists of one or more second salts wherein the Ksp value of each second salt is higher than the first Ksp value,
   adding the suspended chemical to the temperature-stabilized carrier-fluid system so as to produce a well treatment fluid, wherein the suspended chemical reacts with free water when present in the brine, and
   wherein, at temperatures greater than the first temperature, a first portion of the salt crystals dissolves into the brine to bind water and thus prevent free water in the well treatment fluid so as to prevent the suspended chemical from reacting with free water, and wherein the salt crystals are present in an amount such that at least a second portion of the salt crystals remains in crystal form prior to introduction of the well treatment fluid to a wellbore or subterranean formation.

2. The method of claim 1, wherein the salt crystals are distributed homogenously in the temperature-stabilized carrier-fluid system.

3. The method of claim 1, wherein the salt crystals are present sufficiently that at least a portion of the salt crystals remain in crystal form at temperatures higher than the first temperature but lower than the boiling point of the brine.

4. The method of claim 1, wherein the first temperature is ambient temperature, and the step of providing the mixture comprises:

providing the brine at ambient temperature so that the water is saturated with the first salts; and introducing the viscoelastic surfactant into the brine at ambient temperature so as to produce the mixture.

5. The method of claim 4, further comprising, after adding the suspended chemicals, transporting and/or storing the well treatment fluid, wherein the salt crystals are present in the well treatment fluid in an amount that at least the second portion of the salt crystals remains in crystal form during transportation and storage prior to the introduction of the well treatment fluid to the wellbore or subterranean formation.

6. The method of claim 1, wherein the first salts and second salts are selected from the group consisting of salts formed from sodium, potassium, ammonium, calcium, magnesium, formate, carbonate, bromide, chloride, iodide, nitrate, phosphate, and sulfate ions, provided that each second salt has a Ksp higher than the first Ksp value.

7. The method of claim 6, wherein the suspended chemical is an anionic polymer friction reducer.

8. The method of claim 7, wherein the salt crystals are distributed homogenously in the temperature-stabilized carrier-fluid system.

9. The method of claim 8, wherein the salt crystals are present sufficiently that at least a portion of the salt crystals remain in crystal form at temperatures higher than the first temperature.

10. The composition of claim 1, wherein the first Ksp value is 500 or less and the Ksp value of each of the one or more second salts are 501 or more.

11. The method of claim 1, wherein the first Ksp Value is 1200 or less and the Ksp value of each of the one or more second salts are above 1200.

12. The method of claim 1, wherein the temperate-stabilized carrier-fluid system is formed by adding the viscoelastic surfactant to the brine to produce the mixture prior to the one or more salt crystals being added to the mixture to produce the temperate-stabilized carrier-fluid system.

13. The method of claim 12, wherein the brine is saturated with the first salt at a first temperature, and the salt crystals are present sufficiently that at least a portion of the salt crystals remain in crystal form at temperatures higher than the first temperature.

14. The method of claim 13, wherein the first temperature is ambient temperature at which the water-based carrier-fluid system is formed, and wherein the salt crystals are homogeneously dispersed into the mixture.

15. The method of claim 14, wherein the first salts and second salts are selected from the group consisting of salts formed from sodium, potassium, ammonium, calcium, magnesium, formate, carbonate, bromide, chloride, iodide, nitrate, phosphate, and sulfate ions, provided that each second salt has a Ksp higher the first Ksp value.

16. The method of claim 15, wherein the first Ksp value is 500 or less and the Ksp value of each of the one or more second salts are 501 or more.

17. The method of claim 16, wherein the suspended chemical is an anionic polymer friction reducer.

18. The method of claim 15, wherein the first Ksp Value is 1200 or less and the Ksp value of each of the one or more second salts are above 1200.

19. The method of claim 18, wherein the suspended chemical is an anionic polymer friction reducer.

* * * * *